(12) United States Patent
Fink-Petri et al.

(10) Patent No.: US 7,897,253 B2
(45) Date of Patent: Mar. 1, 2011

(54) PIGMENTED CERAMIC PIECE

(75) Inventors: Alke Fink-Petri, Bussigny-Lausanne (CH); Heinrich Hofmann, Pully (CH)

(73) Assignee: Rolex S.A., Geneva (CH)

( * ) Notice: Subject to any disclaimer, the term of this patent is extended or adjusted under 35 U.S.C. 154(b) by 737 days.

(21) Appl. No.: 11/831,245

(22) Filed: Jul. 31, 2007

(65) Prior Publication Data
US 2008/0026207 A1    Jan. 31, 2008

(30) Foreign Application Priority Data
Jul. 31, 2006   (EP) .................... 06405325

(51) Int. Cl.
*B32B 9/00*     (2006.01)
(52) U.S. Cl. .............. 428/325; 428/469; 428/472
(58) Field of Classification Search .............. None
See application file for complete search history.

(56) References Cited

U.S. PATENT DOCUMENTS
6,074,754 A    6/2000   Jacobsen et al.

FOREIGN PATENT DOCUMENTS
EP    07410172 A1    11/1996
WO    WO 03/076521 A1    9/2003

OTHER PUBLICATIONS

F. Garcia Santamaria et al. "Synthetic opals based on silica coated gold nanoparticles" Langmuir, vol. 18, Feb. 5, 2002, pp. 4519-4522.
Kobayashi Y et al.: "Silica coating of silver nanoparticles using a modified Stober method" Journal of Colloid and Interface Science, Academic Press, New York, NY, US, vol. 283, No. 2, Mar. 15, 2005, pp. 392-396.
Partial European Search Report dated Nov. 17, 2006, issued in corresponding European Application No. 06 40 5325.

*Primary Examiner* — Timothy M Speer
(74) *Attorney, Agent, or Firm* — Westerman, Hattori, Daniels & Adrian, LLP

(57) ABSTRACT

The invention relates to a piece comprised in part or in full of a pigmented ceramic in which the pigment is comprised of nanoparticles based on a metal from column IB of the periodic table of the elements or of an alkaline metal, or an alloy of both, coated with a layer of silica, the silica being crystalline silica, particularly cristobalite or tridymite. The ceramic is preferably zirconia or alumina. The nanoparticle silica is crystallized, for example, by a thermal treatment in air or under inert gas at temperatures of between 900° C. and 1400° C. The piece is made by sintering a nanoparticle/ceramic mixture in air or under inert gas at temperatures of between 900° C. and 1250° C.

9 Claims, No Drawings

PIGMENTED CERAMIC PIECE

The present invention relates to a piece comprised in part or in full of a pigmented ceramic, particularly a timepiece component, jewels or jewelry, which may be pigmented throughout its mass or superficially.

It is known that one of the current trends in timepieces, for example, as well as in jewels or jewelry, is to turn to pieces or objects in ceramic, this trend nevertheless is frustrated by the impossibility of obtaining the entire range of colors and deep colors, no matter the pigment or ceramic utilized.

In particular, it is difficult, if not impossible, to obtain to date certain ranges or varieties of red that are strong, bright and stable through time.

Numerous tests have been done in this matter, including using coated nanoparticles, especially silica-coated nanoparticles as pigments, but the final ceramics obtained are still known to have muddy and "dirty" colors, rather similar to an undefined brown.

The object of the invention precisely aims to overcome these disadvantages by precisely proposing timepiece components, jewels or jewelry pieces made in ceramic in the entire range of desired colors, particularly in the red range.

The pieces according to the invention, which are made of pigmented ceramic throughout their mass or superficially, utilize a pigment that is comprised of nanoparticles based on a metal from column IB of the periodic table of the elements (in summary, "metal IB") or an alkaline metal, or an alloy of the latter, coated with a silica layer, the silica being in the form of a crystalline silica, advantageously in the form of cristobalite or tridymite, preferably in the form of cristobalite, which is less restrictive to obtain.

For the purposes of the invention, here we specify that the terms "encased in," "coated with" or "encapsulated in" will be used as synonyms. Furthermore, the terms "core" and "nucleus" will be used indiscriminately for the metal that is coated with crystalline silica.

The metals from column IB of Mendeleev's periodic table of the elements, named class 11 according to the presentation, include copper, silver and gold, which, as alkaline metals (class 1A or 1 according to the presentation) have a free electron on their outermost electronic layer. Because of this, they may induce surface plasmon resonance effects by creating colors, particularly colors between red, purple and blue, their surface plasmon resonance is situated in the visible spectrum. Without going into details, remember that surface plasmon is an exponential decay wave of the two sides of the interface separating the relevant metal of a dielectric medium. This surface plasmon has an evanescent wave character and is responsible for the color effects observed.

The IB metal utilized may be massive or plated. In the latter case, the IB metal will only be the outer layer of a particle whose core is comprised of another IB metal, base metal or mineral. For example, "vermeil," which is very commonly used in jewelry and is gold-plated silver, may be cited.

Alloys, such as 18-carat gold (with a content of 75%), as well as types of gold commonly referred to as "white gold" (gold and nickel alloys), "red gold" (gold and copper alloys), "green gold" (gold and silver alloys), "grey gold" (gold and iron alloys), "purple gold" (gold and aluminum alloys), "yellow gold," "pinkish" or "pink" gold (gold, silver and copper alloys), etc., in goldsmithing may also be used.

For clarity of the following disclosure, from now on we will simply use "metal" to designate an actual metal or alloy indiscriminately.

As indicated above, the various attempts made until now utilizing nanoparticles as pigments unfailingly lead to the "dirty" colors mentioned previously, especially in the red range, regardless of the parameters utilized and the care given to developing the ceramic, a phenomenon that is sometimes accompanied by a color shift to blue.

This may be attributed to, as observed, several factors all intervening during the sintering operation of the ceramic piece: on the one hand, diffusion of metal species across the silica coating when the latter is not crystallized, on the other hand, a phenomenon of coalescence of the nanoparticle cores comprising the pigment when they are polynuclear (see below), and still on the other hand, an agglomeration or agglutination of pigment nanoparticles between them.

On the contrary, when silica is crystallized, this coating is used as a diffusion barrier for the metal comprising the core when the nanoparticle is subjected to high temperatures. There is no coalescence or agglutination.

The transformation of amorphous silica into crystallized silica coating the nanoparticles before their utilization as pigments is done by a thermal treatment at a temperature of between 800° C. (preferably greater than 900° C.) and 1400° C., particularly between 1100° C. and 1250° C., the treatment time then being advantageously between 30 minutes and 24 hours.

This treatment may be done in air or in inert atmosphere, under nitrogen or argon, for example.

Surprisingly, there is no migration or coalescence even if the ceramic is developed at a temperature that is markedly greater than that of the melting point of the metal or alloy comprising the nanoparticle core or cores, with a color that remains "clean" and strong. The crystallized silica perfectly encloses the metal comprising the core or cores. Therefore one may, for example, manufacture red zirconia or alumina ceramic pieces by sintering at a temperature on the order of 1100° C. to 1200° C., pigmented by nanoparticles with a gold core coated with cristobalite, while the melting point of gold is 1036° C. The nanoparticles obtained are thus stable at 1200° C., or at a temperature greater by 136° C. than that of gold!

The silica phase coating the core(s) or nucleus (nuclei) in IB metal or alkaline metal is not important to the result obtained as far as it is crystalline, inasmuch where this metal remains contained, without migration or coalescence. The quartz presents the disadvantage of a transformation from beta-quartz to alpha-quartz around 560° C. with a variation in volume on the order of 5%, which poses practical difficulties. Tridymite and cristobalite will be preferred, especially cristobalite, which is easier to obtain since it necessitates shorter thermal treatments.

In the scope of the invention, the nanoparticles used as pigments may be mononuclear or polynuclear, that is, they may comprise a core in the nucleus in IB metal or alkaline metal, or respectively one or more cores, all coated with a layer of crystalline silica. Then beads or balls will be discussed.

As is known, particles having an average diameter that is generally less than 100-200 nanometers are designated nanoparticles, and in this case, to obtain desired color effects, an average particle diameter of between 5 and 25 nanometers, preferably between 10 to 15 nanometers for mononuclear nanoparticles, will be chosen.

As alkaline metals are very reactive in air and are difficult to handle, their use in nanoparticles intended for pigmenting ceramics are intended for very specific applications. Therefore, metals presenting the most interest will be those from column IB, copper of course, but more particularly gold and silver for the development of pieces constituting luxury commodities.

Of course, a ceramic suitable for the object one wishes to fashion will be used as the ceramic, but an oxide such as zirconia, alumina or their mixtures will be preferred, the zirconias being of interest for their high mechanical properties. Pure zirconia $ZrO_2$ is slightly yellow, alumina $Al_2O_3$ is white, except dense monocrystalline aluminas, which are transparent. The choice of the ceramic will depend on the pieces to be made. Therefore, in the timepiece field, zirconia will be used to make watch containers or bezels, and alumina will preferably be reserved for other pieces, such as pins.

When "zirconia" is referred to, it must be understood that not only actual zirconium oxide, but also zirconias in which the zirconium element was partially replaced by another metallic element, such as yttrium or magnesium are included under these designations. These ceramics are known under the name yttrium zirconia or yttria zirconia, which respectively include yttrium oxide $Y_2O_3$; or magnesia zirconia, which includes magnesium oxide MgO. It is the same for the designation "an alumina," which may include elements other than aluminum, or the designation "a ceramic," which may correspond to complex compositions; these complex ceramics may be stoichiometric or non-stoichiometric.

The quantity of pigment dispersed in the mass of the ceramic is preferably between 1 and 5%, preferably 2 to 4%; the lower values yield more pastel shades, while the higher values yield brighter shades.

For example, ceramic timepiece components may be obtained in the red range by using gold nanoparticles with an average diameter of between 10 and 15 nanometers dispersed in a zirconia or zirconia/alumina matrix.

Here it is observed that the colors may, in addition, be modulated by playing with the intrinsic color of the ceramic and/or the color provided by the metal comprising the core of the nanoparticles.

The thickness of the crystallized silica coating layer is not critical as long as the layer is sufficient. It appears that a value of 3 nm is the minimum and 50 nm is the practical maximum that will obviously only be reached for "large" diameter nanoparticles, on the order of 100-200 nanometers. This thickness has relatively little effect on the color, contrary to the size of the nanoparticles themselves. For example, in the case of gold, the larger the nanoparticle size, the more the shade is drawn towards metallic blue, while the smaller the nanoparticle size, the more the shade is drawn towards red.

In addition, all things being equal, the use of silver instead of gold gives slightly more yellow shades.

The crystalline silica-coated metal nanoparticles are prepared in suspension in an alcohol medium (methanol, ethanol, propanol, isopropanol or isobutanol in particular) in the presence of ammonia. Fine colloidal particles of the metal chosen are suspended in the aforementioned medium, then an alk-oxysilane, also called alkylorthosilicate or siloxane (terms used indiscriminately in the rest of the disclosure) is added as the source of Si whose transformation in the presence of water added to the reaction mixture will produce silica that is deposited on the metal particles. Colored metallic nanoparticles that are coated with amorphous silica are thus obtained.

The amorphous silica-coated nanoparticles are transformed into crystallized silica-coated nanoparticles by heating the particles, once they are isolated, to the temperatures indicated above. For example, by heating gold nanoparticles to 1200° C. in air for several hours, gold nanoparticles are obtained whose color saturation strongly increases in an unexpected manner. The amorphous silica coating the gold is transformed into one of its crystalline phases, in this case cristobalite, which is a phase that is metastable at ambient temperature.

Colored ceramic pieces are then made by sintering a powder comprised of the mixture of ceramic particles, for example, zirconia, alumina or their mixtures, as indicated above, and crystallized silica pigment nanoparticles. Sintering may be carried out at a final temperature of, for example, between 900° C. and 1400° C. for 30 minutes to 24 hours and possibly under pressure. The actual sintering may be preceded by pre-sintering.

Methods for forming ceramic pieces are well known and may be grouped together by categories, that is, wet process methods, dry process methods and injection methods. In the first methods, slip casting, tape casting and pressure casting or low-pressure injection molding are cited. Among the second methods, hot or cold uniaxial pressing, hot or cold isostatic pressing and flash sintering are named, for example. Lastly, low-pressure injection molding (already cited above) and high-pressure injection molding are indicated by way of example in the third category of methods. All are suitable for manufacturing pigmented ceramic pieces according to the invention at various degrees. However, if one wishes to prepare a piece by forming at a temperature of less than approximately 1250° C., one will advantageously start with a nano-structured or dispersed ceramic powder, and/or a powder including additives, and wet process methods will be favored.

Depending on the fashion in which one proceeds with the step of developing the final piece, a piece that is pigmented in its mass or a piece pigmented at the surface only will be obtained.

Thus, after thermal treatment, all sorts of ceramic pieces or objects that are pigmented in their mass or at their surfaces, in all colors and with a great deal of freedom of shapes, may be obtained, of course including jewel or jewelry adornments, but also timepiece components, particularly containers, bezels, dials, bracelet parts, pins and accessories such as winders. One may thus have access to red color pieces that are pigmented in their mass, which are impossible to manufacture otherwise.

In addition to a number of advantages, by obtaining reds as indicated above, it is recalled that the manufacture of pigmented ceramics according to the invention is ecological and respectful of the environment. In fact, this manufacturing method only uses alcohols as solvents.

The invention will be better understood with reference to the following examples, given as non-limiting examples. Examples 1 to 7 relate to pigmentations in the mass, while example 8 relates to superficial pigmentation.

EXAMPLE 1

10 ml of a suspension of gold (BB International, colloidal gold, 15 nanometers C=$5.5 \cdot 10^{-5}$ g gold/ml) is placed in a flask and 400 ml of ethanol (Merck, absolute ethanol for analysis) and 30 ml of 28% ammonia are added by agitation. The flask is then placed in an oil bath whose temperature is adjusted to 50° C., then the mixture is agitated with a magnetic agitator. 5 ml of tetraethyl orthosilicate TEOS (Merck) is quickly added to the mixture. The suspension is left to react at this temperature under agitation for one hour. After which, the flask is removed from the oil bath, the suspension is allowed to cool to ambient temperature and the magnetic agitator is removed. The powder is isolated from the suspension by eliminating the dispersant under vacuum.

Amorphous silica nanoparticles with gold cores are thus obtained, which are heated in air up to 1200° C. for several hours, until a significant change in the color saturation is detected.

Analysis by X-ray diffraction then shows that the amorphous silica in the gold coating layer was modified into cristobalite by heating.

To manufacture the finished piece, the slip casting method is used by proceeding with filtration under pressure of a stabilized colloidal suspension containing isolated particles of nanostructured yttria zirconia and nanoparticles of pigments in a ratio of 2% pigment/zirconia by weight, the proportion by weight of solids in the suspension may be between 10 and 60%.

The suspension is then forced by a piston through a ceramic filter covered by a filter under pressure on the order of 10 MPa, which remains constant until all of the suspension is filtered. The piece is dried by dessication until the mass is stabilized, then sintered in air between 1200° C. and 1300° C. Thus, a bright red ceramic piece is obtained.

Here it is mentioned that the nanoparticles/zirconia weight proportions may vary from 0.5 to 5%, subject to that which is indicated in the following example. The filtration pressure may be spread out from 2 to 20 MPa, and the sintering time varies from 30 minutes to 8 hours, while remaining in the red range.

EXAMPLE 2

The invention proceeds as described in example 1, but after the drying operation of the native piece by dessication, the piece is subjected to an additional cold isostatic pressure step. This further densifies the piece before sintering.

EXAMPLE 3

The invention proceeds as described in example 1, but after the drying operation of the native piece by dessication, the piece is subjected to a pre-sintering in air step at a temperature of between 1000° C. and 1200° C. The piece then undergoes hot isostatic pressing treatment under pressure and in an inert gas atmosphere of between 50 and 300 MPa, at a temperature varying between 1200° C. and 1300° C.

EXAMPLE 4

The invention proceeds as described in example 1, but with higher nanoparticle/zirconia weight proportions (4%). The particles then tend to agglomerate; this trend is countered by subjecting the mixture to a dispersion treatment by ultrasound.

EXAMPLE 5

The invention proceeds as described in example 1 by replacing the gold suspension with a silver suspension, and therefore a piece pigmented by silver nanoparticles is obtained in a red shade that is more yellow than the piece from example 1.

EXAMPLE 6

The invention proceeds as described in example 1 by replacing the zirconia with alumina, and therefore a piece is obtained whose red is drawn towards pink when compared to the piece from example 1.

EXAMPLE 7

The invention proceeds as described in example 1 by replacing the zirconia with a zirconia/alumina mixture that is 50/50 by weight, and therefore a piece that is also red is obtained.

EXAMPLE 8

The invention proceeds as described in example 1, but is modified in such a way that, on the one hand, the nanoparticles are implemented and, on the other hand, the ceramic is implemented as follows:

The ceramic piece, without pigments, is formed and then pre-sintered in air or under neutral gas at a temperature of between 850° C. and 1150° C. After this thermal treatment, the pre-sintered piece is plunged in a colloidal suspension of crystallized silica-coated pigment nanoparticles. The piece is then dried in a dessicator and then sintered, possibly under pressure, between 1200° C. and 1300° C.

In all the examples, the ethanol and the tetraethylorthosilicate may be replaced by another alcohol and another tetraalkylorthosilicate, preferably by using the same R Alkyl radical, for example by using tetramethyl orthosilicate TMOS if one uses methanol as the alcohol or tetraisopropylorthosilicate if isopropanol is used, etc.

The ammonia may also be replaced by an aqueous sodium hydroxide or potassium carbonate solution.

The invention claimed is:

1. A piece comprised in part or in full of a pigmented ceramic, wherein the pigment is comprised of nanoparticles based on a metal from column IB of the periodic table of the elements or an alkaline metal, or an alloy of the latter, coated with a layer of silica, the silica being crystalline silica.

2. A piece according to claim 1, wherein the crystalline silica is in cristobalite or tridymite form.

3. The piece according to claim 1, wherein the metal is gold or silver or one of their alloys with each other or with other metals.

4. The piece according to claim 1, wherein the ceramic comprises from 1 to 5% by weight of dispersed pigment.

5. The piece according to claim 1, wherein the nanoparticle size is between 5 and 25 nm.

6. The piece according to claim 1, wherein the ceramic is an oxide.

7. The red color piece according to claim 3, wherein the metal is gold or a gold/silver alloy and the ceramic is zirconia.

8. The piece according to claim 1, wherein the piece consists of a watch container, a dial, a bezel, a bracelet or pins.

9. The red color piece according to claim 6, wherein the ceramic is zirconia or alumina or a mixture of the two.

* * * * *